Jan. 11, 1949.  R. W. GILBERT  2,459,104
ELECTRONIC MEASURING APPARATUS

Filed June 8, 1945  2 Sheets—Sheet 1

Inventor:
Roswell W. Gilbert,
By Pierce & Scheffler,
Attorneys.

Jan. 11, 1949.   R. W. GILBERT   2,459,104
ELECTRONIC MEASURING APPARATUS
Filed June 8, 1945   2 Sheets-Sheet 2

Inventor:
Roswell W. Gilbert,
Pierce + Scheffler, Attorneys.

Patented Jan. 11, 1949

2,459,104

UNITED STATES PATENT OFFICE 2,459,104

ELECTRONIC MEASURING APPARATUS

Roswell W. Gilbert, Montclair, N. J., assignor to Weston Electrical Instrument Corporation, Newark, N. J., a corporation of New Jersey Application June 8, 1945, Serial No. 598,401

2 Claims. (Cl. 179—171.5)

This invention pertains to electronic measuring apparatus of the type adapted to the measurement of minute D. C. currents and more particularly to thermal modulators and to measuring apparatus including a thermal modulator in which a modulated high frequency current is employed to develop periodic variations of the resistance of the modulator.

The amplification of small direct currents for measurement and other purposes is a general problem of considerable importance. Vacuum tube amplification of direct current as such is limited to higher order of potentials because of the characteristic variability of the tube element contact potentials. This limitation applies to all conductively coupled amplifiers. However, when reactively coupled as an A.-C. amplifier, D.-C. drift factors do not directly affect the input-output relationship and a relatively tremendous gain can be realized without contact potential instability effects. Thus, it is apparent that proper conversion of the direct current to be measured into alternating current for amplification is a possible means for avoiding the limitations of straight D.-C. amplification. The problem then is to convert the small, direct current input potentials to alternating current potentials without introducing spurious components. With such conversion of the small input potential the resultant alternating current potential can be amplified, rectified, and degenerated back against the input potential for independence of changes in amplifier gain. In accordance with accepted terminology a converter of this class may be termed a modulator.

Basically, modulation may be accomplished by an A.-C. variation of any one of the three fundamental impedances; capacitance, inductance or resistance. All three have been utilized in the art but the apparatus previously employed imposes limitations in stability. In capacity modulation there exist contact potential differences characteristic to the surfaces of the variable condenser plates and these contact potential differences are fed directly into the input circuit of the amplifier. Inductance modulation devices are extremely sensitive to stray magnetic fields and resistance modulation therefore offers the best approach to a solution of the problem but the vibrating contact devices commonly used are subject to electrochemical film potentials that create a noise voltage.

The thermal modulator of this invention overcomes the objections inherent in existing resistance modulators by employing a resistance element that can be made to vary its resistance at a sufficiently high frequency for practical amplification. This is accomplished by using a fine wire resistance element having a very short thermal time constant and a large temperature coefficient of resistance, and varying the resistance of the wire by changing its temperature under the action of a high frequency current that is modulated at audio frequency periods.

An object of this invention is the provision of a thermal modulator for converting D.-C. potentials into A.-C. potentials.

Objects of this invention are the provision of a resistance type modulator comprising a fine resistance wire or series of wires in the form of an electrical bridge, circuit elements for developing a high frequency current modulated at audio frequency periods for application to a resistance or to one diagonal of the resistance bridge, and circuit elements for applying the D-C potential to be measured to the resistance wire or to the other diagonal of the bridge, whereby the resistance of the fine wire or wires will vary cyclically at a frequency corresponding to the audio frequency to thereby convert the D.-C. potential into an A.-C. potential.

An object of this invention is the provision of an electronic device for the measurement of small D.-C. potentials, the device comprising an A.-C. amplifier interposed between an output meter and a thermal converter, whereby the D.-C. potential is converted into an A.-C. potential by the thermal converter and amplified, and the output meter provides a measure of the input D.-C. potential.

Another object is the provision of a D.-C. potential measuring device comprising an A.-C. amplifier, a thermal modulator in the input side of the amplifier, a phased rectifier connected to the output of the amplifier and a D.-C. output meter connected between the rectifier and a degenerating resistor that forms part of the input circuit to the thermal modulators, whereby the indication of the output meter will be a direct measure of the D.-C. potential applied to the modulators.

These and other objects and advantages will be apparent from the following description when taken with the accompanying drawings which illustrate several embodiments of the invention. The drawings are for purposes of illustration and are not to be construed as defining the scope and limits of the invention, reference being had for this purpose to the appended claims.

In the drawings wherein like characters refer to like parts in the several views.

Figure 1:
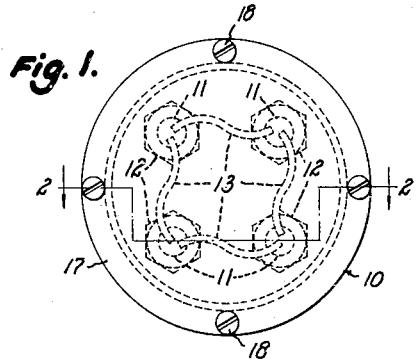
Figure 1 is a plan view of a bridge type, thermal modulator made in accordance with this invention.
Figure 2:
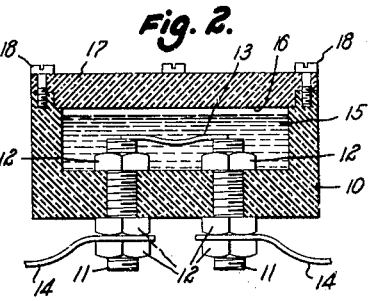
Figure 2 is a central cross sectional view of the device along the section line 2—2 of Fig. 1.

Referring now to Figures 1 and 2, the numeral 10 identifies a casing that is made preferably of polystyrene which is a good high frequency insulator. Molded in or threaded through the base of the casing are four terminal studs 11 on which nuts 12 are threaded or brazed to the inner ends of the terminals 11. Fine wires 13 are soldered in the form of a closed loop or bridge and external circuit connections to the bridge may be made by wires 14 clamped between adjacent nuts 12. The wires 13 may comprise any suitable metal or alloy having a very short thermal time constant and a large temperature coefficient of resistance. Platinum wire of .001 inch diameter satisfies these design requirements. To decrease the time constant of the wires 13 upon cooling, the wires are immersed in a liquid 15 that fills the chamber in the case 10 except for a small air space 16 which provides a safeguard against damage in the event of excessive expansion of the liquid. While water may be used for this purpose it has a rapid deteriorating effect upon the small diameter wires and it is therefore preferable to use an inert liquid such as xylene. The casing 10 is made liquid tight by a cap 17 that is secured to the case by screws 18.

A thermal modulator constructed as above described has a thermal time constant of approximately .015 seconds. Thus, it is apparent that a 60 cycle alternating current injected into the bridge across one of its diagonals will cause the resistance of each wire to change from a low to a high value in accordance with the heating effect produced by each cycle of the alternating current. This cyclic variation of the bridge resistance is employed to convert a D.-C. current into an A.-C. current as will be fully described hereinbelow.

Figure 3:
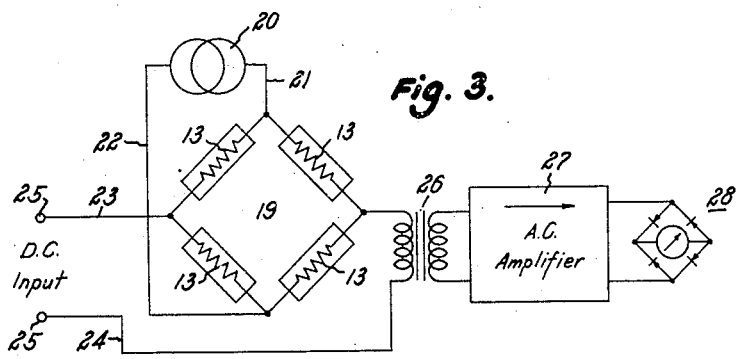
Figure 3 is a circuit diagram illustrating a simple means for cyclically varying the resistance of the fine wires forming the thermal modulator bridge.

A simple circuit arrangement may be set up, as shown in Fig. 3, for working the thermal modulator bridge into an A.-C. amplifier and an output meter to provide a direct reading device for the measurement of very small D.-C. potentials in the order of microvolts. The thermal modulator bridge is identified generally by the numeral 19 and comprises the four wires 13 which are shown encased within individual chambers for purposes of clarity but which actually take the form of a unitary device illustrated in Figs. 1 and 2. An audio frequency source of heating current is shown as a conventional alternator 20 although the common 60 cycle power line may be used. The alternator 20 is connected across one diagonal of the thermal modulator bridge 19 and the D.-C. potential to be measured is applied to the other bridge diagonal by wires 23 and 24 that extend to suitable input terminals or binding posts 25. Included in the D.-C. input circuit is a transformer 26 to which is coupled a conventional A.-C. amplifier 27 having a rectifier type meter 28 in the output circuit thereof.

The modulator bridge 19 is balanced, i. e., the ohmic resistance of each wire 13 is identical, to exclude from the amplifier input any component of the heating current developed in the bridge by the alternator 20. As the wires 13 have a very short thermal time constant it is apparent that the wires 13 will heat up and cool off alternately in a cyclic manner corresponding to the frequency of the source 20. The resistance of each wire and, consequently, that of the entire bridge will vary periodically, thus causing the magnitude of the D.-C. input current to transformer 26 to vary cyclically. An induced A.-C. potential and current appears in the transformer secondary winding and this periodically varying current is amplified by a conventional A.-C. amplifier 27. The amplifier output is impressed through the rectifier meter 28 that is calibrated to provide a direct measure of the D.-C. input voltage.

The simple arrangement illustrated in Fig. 3 is open to the objection that the heating current must be so large in relation to the D.-C. input current to be measured that it is difficult to obtain the required fineness of initial bridge balance, and this requirement is aggravated by the nature of the small wires essential to the maintenance of bridge balance over the entire heating cycle. This objection can be overcome by heating the fine wires 13 by a current having a frequency that is relatively high compared to the acceptance band of the amplifier. The high freqeuncy heating current is modulated at audio frequency, preferably 60 cycles, to produce the cyclic resistance variations of the thermal modulator bridge.

Figure 4:
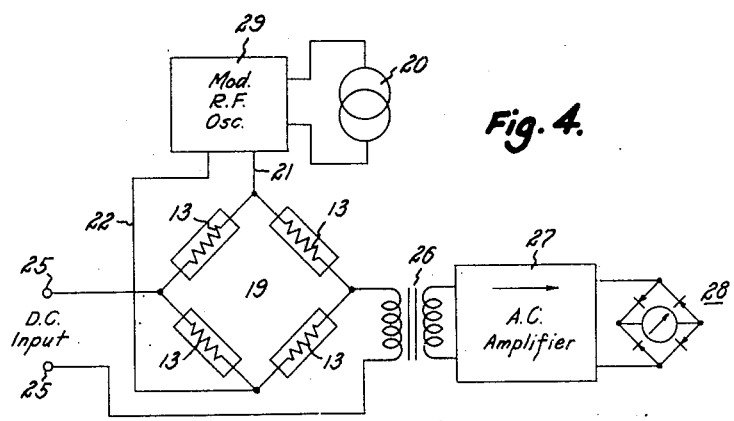
Figure 4 is a circuit diagram similar to Figure 3 and illustrating a practical means for varying the resistance of the modulator bridge by a high frequency current that is itself modulated at audio frequency periods.

An arrangement using a high frequency heating current is illustrated in Fig. 4 wherein the high frequency oscillations produced by the oscillator 29 are modulated by the 60 cycle source 20 and the resultant modulated current is impressed across one diagonal of the bridge 19 through wires 21, 22. In this arrangement the heating current contains no low frequency component except power and no spurious low frequency components are present in the modulator bridge 19. Two sources of possible disturbance fortunately prove negligible in practice. If the heated wire 13 had a finite response at the fundamental frequency of the heating current it would have a detection coefficient greater than zero and would, consequently, rectify the high frequency current to produce an unwanted D.-C. component. This is overcome by using a driving frequency that is high relative to the time constant of the wire, for example frequencies of the order of several megacycles. Also, parasitic thermoelectric potential difference can develop at the ends of each individual wire 13 but this effect is reduced to an insignificant minimum by maintaining symmetry of the bridge arms.

Figure 5:
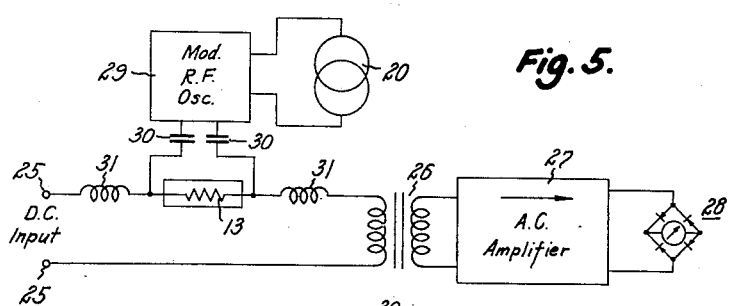
Figure 5 is a circuit diagram illustrating another embodiment of the invention wherein a single wire is employed as a thermal modulator.

The circuit of Fig. 4 may be simplified, as illustrated in Fig. 5, by substituting a single thermal modulator wire 13 for bridge type modulator 19. The modulator wire 13 is connected in common to both the heating circuit and the input circuit and these circuits must, therefore, be isolated functionally from each other. The condensers 30 block the D.-C. input current from the oscillator and the chokes 31 prevent the high frequency current from circulating within the D.-C. input circuit and the transformer.

Figure 6:
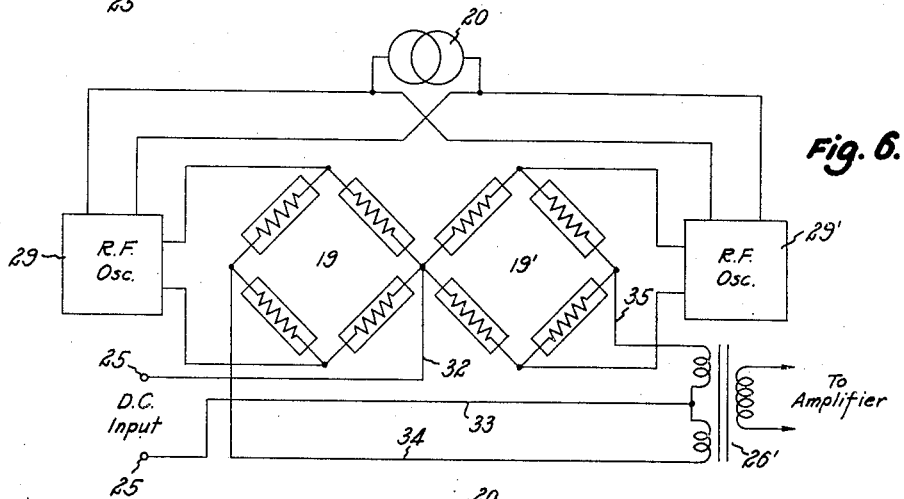
Figure 6 is a circuit diagram showing a full wave version of the modulator bridge.

Another modification of the Fig. 4 circuit comprises, as shown in Fig. 6, a double bridge or full wave type of modulator. The thermal modulator bridges 19, 19' are heated in phase opposition by the independent radio or high frequency oscillators 29, 29 that are modulated in opposition by the common low frequency source 20 as indicated by the cross over connection. One side of the D.-C. input circuit is connected by the wire 32 to the common connection of the two bridges 19, 19' and the other side of the input circuit is connected by the wire 33 to the midpoint of the primary winding of the transformer 26' that is followed by an amplifier and rectifier meter, not shown but similar to or identical with amplifier 27 and meter 28 of Fig. 4. The ends of the primary winding are independently connected by wires 34 and 35 to the thermal bridges 19 and 19' respectively. With this arrangement the two bridges alternately heat and cool in opposition and in response to the frequency of the source 20; more specifically, as the bridge 19 is heating up the bridge 19' is cooling and vice versa. Thus, the effective resistance of each bridge is alternately high and low and, as the two bridges are inserted in the D.-C. input circuit in parallel, the D.-C. input current will flow through the bridge having the lower resistance at any given instant. It is apparent that the magnitude of the D.-C. input current will vary in proportion to the resistance changes of the thermal modulator bridges which produces, in effect, a flow of A.-C. current through the transformer winding and amplification of the resultant A.-C. current may be accomplished by means of a conventional A.-C. amplifier, as is well known in the art.

Figure 7:
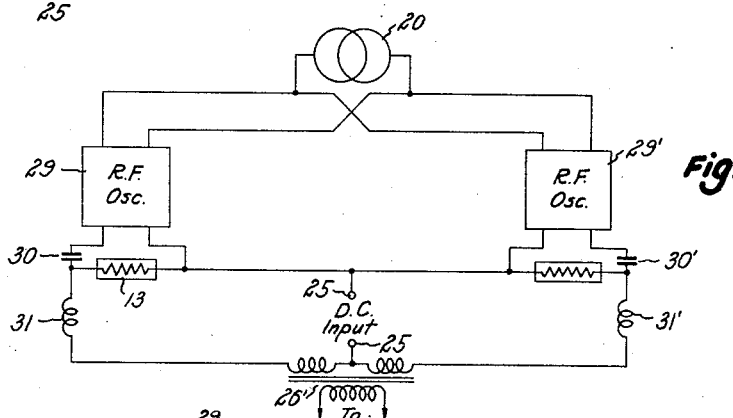
Figure 7 is a circuit diagram showing a full wave version of the modulator bridge but employing only two heater wires.

A simplified, full wave embodiment of the invention is illustrated in Fig. 7 wherein two heater wires 13, 13' are heated in phase opposition. The high frequency currents produced by the oscillators 29, 29' are modulated at 60 cycles by the source 20 but in phase opposition as indicated by the cross over connection between the source 20 and the oscillators. The output of the oscillator 29 is applied to the heater wire 13 through a blocking condenser 30, the function of the latter being to prevent circulation of the D.-C. input current within the oscillator. Similarly, the output of the oscillator 29' is applied to the heater wire 13' through the blocking condenser 30'. One terminal 25 of the D.-C. input circuit is connected to the common point of the heater wires 13, 13', and the other input terminal 25 is connected to the midpoint of the primary winding of the transformer 26'. The ends of the transformer primary winding are connected to the outer ends of the heater wires 13, 13' through the chokes 31, 31', the latter preventing circulation of the high frequency currents through the D.-C. input circuit.

It will noted that the blocking condensers 30, 30' and the chokes 31, 31' effectively isolate the two circuits (high frequency oscillator circuit and D.-C. circuit) except within the heater wires 13, 13'. In operation, the resistance of each heater wires varies independently from high to low in accordance with the heating effect produced by the modulated output currents of the two oscillators; the resistance of heater wire 13 increasing as the resistance of heater wire 13' decreases by reason of the out of phase modulation produced by the low frequency source 20. Hence, at any given instant the D.-C. input divides between the two heater wires, the larger portion flowing through the heater wire having the lower resistance value at that particular instant. Thus, the D.-C. input current will flow through the heater wire 13 and will increase in magnitude to some maximum value depending upon the lowest ohmic value of resistance attained by the wire. As the wire 13 heats up in accordance with the modulated envelope of the current output of oscillator 29, the amount of D.-C. input current flowing therethrough will decrease. However, as the wire 13 is heating up the wire 13' is cooling off and at some point in the cycle the greater portion of the D.-C. input current will flow through the wire 13'. The result of this modulation and shift in the D.-C. input current produces, in effect, an alternating current flow through the transformer 26' that may be amplified by a conventional A.-C. amplifier.

Figure 8:
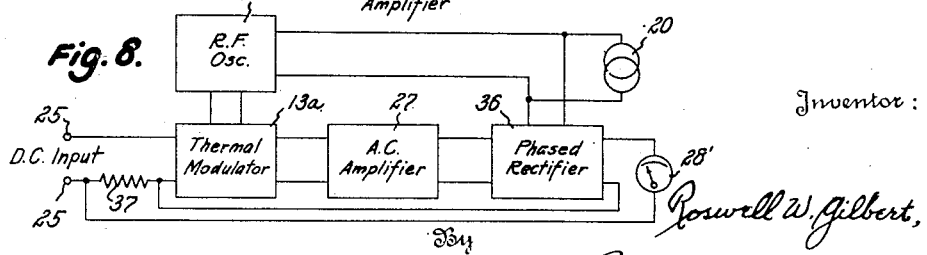
Figure 8 is a block diagram illustrating a typical arrangement employing a thermal modulator in conjunction with a phased rectifier and a degenerative circuit to provide independence of amplifier gain variations.

A practical device employing the novel thermal modulators for the measurement of very small D.-C. potentials is illustrated schematically in Fig. 8. The particular form of the thermal modulator wire or bridge 13a may be any of the various types described above. The radio frequency oscillator 29 and the A.-C. source 20 for modulating the radio frequency current at audio frequency periods are of conventional types as is also the phased rectifier 36 connected in the amplifier output circuit. These elements are shown in block form as their construction and use are well known. In order to produce stable amplification the output of the amplifier is degenerated back into the D.-C. input circuit in the conventional manner through a D.-C. output meter 28' and degenerative resistor 37 in the D.-C. input circuit. The output rectifier is phased with the heating current modulation source so that the D.-C. output has polarity sense and the system is, consequently, operable through zero input should the input change polarity.

Having now described several embodiments of the invention, additional variations and modifications will be apparent to those skilled in the art. The thermal modulator is basically new in the art and it is, therefore, intended that such variations and modifications fall within the scope and spirit of the invention as set forth in the following claims.

I claim:

1. A thermal modulator comprising a continuously balanced resistance bridge, each arm of said bridge being a resistance element having an appreciable temperature coefficient of resistance and a short thermal time constant, a direct current circuit connected across one pair of opposite junctions of said bridge, and a source of relatively high frequency heating current connected across the other pair of bridge junctions and including means for modulating the high frequency current at a relatively low frequency, whereby the resistance of said bridge will vary cyclically at the low frequency.

2. A thermal modulator comprising a continuously balanced resistance bridge, a direct current circuit connected across one pair of opposed junctions of the bridge, each arm of the bridge being a resistance element having an appreciable temperature coefficient of resistance and a short thermal time constant, a casing within which said resistance bridge is mounted, liquid within said casing to above the level of said resistance bridge, and a source of relatively high frequency heating current connected across the other pair of opposed junctions of said bridge and including means for modulating the high frequency heating current at a relatively low frequency, whereby the effective resistance of the bridge presented to the direct current circuit connected across said first pair of opposed junctions will vary cyclically at the low frequency.

ROSWELL W. GILBERT.

REFERENCES CITED

The following references are of record in the file of this patent:

UNITED STATES PATENTS

| Number | Name | Date |
|---|---|---|
| 1,919,053 | Brinton | July 18, 1933 |
| 1,987,539 | Razek et al. | Jan. 8, 1935 |
| 2,087,950 | Holden | July 27, 1937 |
| 2,137,020 | Luck | Nov. 15, 1938 |
| 2,297,543 | Eberhardt et al. | Sept. 29, 1942 |
| 2,367,868 | Jones | Jan. 23, 1945 |